United States Patent [19]
Townsend

[11] Patent Number: 5,531,470
[45] Date of Patent: Jul. 2, 1996

[54] SIDE AIR BAG INCORPORATED IN VEHICLE OUTER ARMREST

[75] Inventor: John A. Townsend, Troy, Mich.

[73] Assignee: Joalto Design, Inc., Southfield, Mich.

[21] Appl. No.: 510,514

[22] Filed: Aug. 2, 1995

Related U.S. Application Data

[60] Continuation-in-part of Ser. No. 257,080, Jun. 9, 1994, which is a division of Ser. No. 912,790, Jul. 13, 1992, Pat. No. 5,378,036.

[51] Int. Cl.⁶ .................................................. B60R 21/22
[52] U.S. Cl. ............................ 280/730.2; 280/730.1; 296/153
[58] Field of Search .......................... 280/730.2, 730.1, 280/728.1; 297/411.32; 296/153

[56] References Cited

U.S. PATENT DOCUMENTS

| 2,036,118 | 3/1936 | Carr | 296/68 |
|---|---|---|---|
| 3,191,993 | 6/1965 | Parks | 297/388 |
| 3,322,463 | 5/1967 | Neale et al. | 297/417 |
| 3,594,036 | 7/1971 | Cadiou | 296/155 |
| 3,623,768 | 11/1971 | Capener | 297/390 |
| 3,807,799 | 4/1974 | Freedman | 297/417 |
| 3,888,540 | 6/1975 | Protze et al. | 297/384 |
| 3,899,191 | 8/1975 | Royce | 280/150 SB |
| 3,967,851 | 7/1976 | Stier | 297/416 |
| 4,159,145 | 6/1979 | Quakenbush | 297/113 |
| 4,230,414 | 10/1980 | Cheshire | 403/95 |
| 4,323,278 | 4/1982 | Sukopp et al. | 297/481 |
| 4,372,580 | 2/1983 | Motonami et al. | 280/802 |
| 4,600,217 | 7/1986 | Naumann et al. | 280/808 |
| 4,668,010 | 5/1987 | Fujiwara | 297/150 |
| 4,881,778 | 11/1989 | Stephenson et al. | 297/417 |
| 5,072,966 | 12/1991 | Nishitake et al. | 280/730.2 |
| 5,106,160 | 4/1992 | Nomura et al. | 297/417 |
| 5,112,079 | 5/1992 | Haland et al. | 280/730.2 |
| 5,172,790 | 12/1992 | Ishikawa et al. | 180/268 |
| 5,224,733 | 7/1993 | Simsic | 280/730 |
| 5,251,931 | 10/1993 | Semchena et al. | 280/730 |
| 5,277,441 | 1/1994 | Sinnhuber | 280/750.1 |
| 5,290,084 | 3/1994 | Sinnhuber | 296/68.1 |
| 5,316,336 | 5/1994 | Taguchi et al. | 280/730 A |
| 5,348,342 | 9/1994 | Haland et al. | 280/730 A |

FOREIGN PATENT DOCUMENTS

| 1220266 | 6/1966 | Germany . | |
| 2038050 | 2/1972 | Germany . | |
| 3344707A | 6/1985 | Germany | B60N 1/06 |
| 3435678A | 6/1986 | Germany | B60R 22/02 |
| 3701419A1 | 7/1988 | Germany | B60N 1/06 |
| 3-281455A | 12/1991 | Japan | B60R 21/16 |
| 4-50052A | 2/1992 | Japan | B60R 21/16 |
| 4-356246A | 9/1992 | Japan | B60R 21/16 |

Primary Examiner—Christopher P. Ellis
Attorney, Agent, or Firm—Limbach & Limbach

[57] ABSTRACT

A vehicle side impact air bag system is disclosed wherein the air bag is located in an outboard armrest pivotably attached to a vehicle seat. During a collision, a cover panel located over an aperture in the outboard side of the armrest releases, and the air bag deploys outwardly through the aperture away from the occupant and against the vehicle door. Preferably, the air bag fills the entire space between the occupant and the door in order to protect the torso, neck and head of the occupant during the collision. The inventive system may be used with a vertically movable door or with a conventional door.

6 Claims, 3 Drawing Sheets

SIDE AIR BAG INCORPORATED IN VEHICLE OUTER ARMREST

This is a continuation-in-part of application Ser. No. 08/257,080, filed Jun. 9, 1994, which is a divisional of application Ser. No. 07/912,790, filed Jul. 13, 1992, U.S. Pat. No. 5,378,036.

BACKGROUND OF THE INVENTION

1. Field of the Invention

The present invention relates to restraint systems in vehicles, and in particular to inflatable "air bag" systems deployable from outboard armrests on vehicle seats.

2. Discussion of the Prior Art

Inflatable air bags used to protect vehicle occupants during a collision are well known in the art of restraint systems. Typically, these devices are located in the steering wheel or instrument panel and deploy in the event of frontal collision.

It has also been previously proposed to locate air bags on the outboard side of vehicle occupants to absorb energy during a side impact, or during a collision having at least a lateral component. Various mounting locations have been proposed, including locating the air bag in the back rest portion of the seat, the seat bottom, a door panel, a door mounted armrest, or in the vehicle roof above the door. From these positions, the air bag is able to inflate in the area between the occupant and the door.

During a collision of sufficient energy, a impact sensor triggers a gas generator which rapidly inflates the air bag. Because the air bag must fill so rapidly in order to protect the occupant, its operation is essentially a contained explosion. As such, injuries can occur to the occupant, aside from the collision itself, when the air bag is normally deployed. In designing air bag systems, a balance must be struck between ensuring that the air bag deploys quickly enough to protect a vehicle occupant during a high speed collision, and reducing the risk of injury due to a rapidly inflating air bag.

The design challenge becomes more difficult for side impact air bag systems. Compared to a frontal impact, there is very little time or distance between a side impact and intrusion upon the occupant. Unlike a frontal impact, there is essentially no time or distance for energy to be absorbed in crumple zones of the vehicle or for the impact to travel through the vehicle structure before reaching the occupant. An air bag must inflate even more rapidly in a side impact than in a frontal impact in order to cushion the occupant from the impact and help protect against physical intrusion into the seating area. This is also much less room beside an occupant to deploy an air bag, as opposed to in front of a seated occupant. Therefore, side impact air bags inherently afford less protection from collision and greater exposure to deployment injuries than do standard air bags for frontal collisions. Because of this, side impact air bag location and deployment direction are critical design criteria.

Air bags located in door armrests or panels have a number of drawbacks. These types of configurations typically require the air bag to deploy directly toward the occupant's head or torso, much like a front mounted air bag, but with less distance between the stowed air bag and the occupant and less time for deployment. This increases the risk of injury due to deployment.

In order to protect the occupant's head during a collision, a separate air bag must deploy from the roof or alternatively the arm rest mounted air bag must extend from the occupant's lower torso up to his or her head when the air bag is inflated. This long distance requires more inflation time and or a more violent burst of gas to inflate, also increasing the risk of injury.

When extending up towards the occupant's head from the armrest, the air bag may snag or get caught up in the seat, the occupant, or his or her clothing. A more forceful inflation may be required to insure that the air bag fully extends in the narrow area between the occupant and the door. In this configuration, the air bag inflates into the side of the occupant's lower rib cage. This violent explosion of the expanding air bag not only poses a danger to the rib cage, but also pushes the occupant's outside arm upward, which can also cause a serious injury or affect the full deployment of the air bag.

Another problem associated with an air bag mounted in the door armrest or panel is its inability to remain optimally positioned between the occupant and the door or side of the vehicle. Because the occupant typically can adjust the seat in a variety of directions, the air bag must be made larger to cover all of the possible seat positions. Otherwise, extremities of the occupant will not be protected in certain seat positions. Even with a larger air bag, the cushioning may not be accurately focused on the occupant, and the above mentioned problems such as deployment time, deployment force, and snagging are exacerbated.

An air bag mounted in a door armrest is also susceptible to displacement during a collision. When a second vehicle intrudes into the door structure of the first vehicle, the position or orientation of the air bag in the door of the first vehicle may be disrupted enough to cause improper deployment of the air bag. For instance, the air bag may be pushed into the vehicle or even into the occupant's outer side before it can properly deploy.

Some of the above problems can be solved by locating the side impact air bag in the seat back or bottom cushion. In these locations the air bag moves with the occupant when the seat is adjusted so the air bag remains optimally focused on the occupant and does not have to be any larger than necessary. The air bag is also farther away from the impact, giving it more time to deploy. However, in these locations the air bag is deployed directly adjacent to the occupant, increasing the risk of injury. The possibility of objects interfering with proper air bag deployment is also a problem. During an accident, the occupant may block or partially obstruct the initial deployment of the air bag, or it may become snagged on the seat, armrest, interior door surface or restraint belt. Also, when the air bag is mounted in the seat bottom, it has a longer distance to travel to become fully deployed than an air bag mounted in a door armrest or panel.

What is needed, and is lacking in the prior art, is a side impact air bag system which deploys the air bag from a location central to the occupant, a location that remains centrally focused on the occupant even when the seat position is shifted, and deploys in such a manner that both the risk of injury due to deployment and the possibility of the air bag snagging on the occupant or adjacent objects are minimized.

SUMMARY OF THE INVENTION

In accordance with one aspect of the present invention, an air bag arranged to deploy in the event of a side impact is provided within a pivotally mounted armrest located on the outboard side of a vehicle seat, so as to be centrally located with respect to the outboard side of a vehicle occupant.

In accordance with another aspect of the present invention, the armrest is connected to and is movable with the seat so as to remain centrally focused on the occupant over a wide range of seat adjustment positions.

In accordance with yet another aspect of the present invention, the air bag system is configured to deploy away from the vehicle occupant, so as to significantly reduce the chance of a deployment injury.

In accordance with still another aspect of the invention, the air bag system is configured to outwardly deploy against a generally smooth interior surface of a vehicle door. As there is no armrest located on the door, the air bag will not hang up on the armrest or on the occupant's arm when deploying.

In the preferred embodiment, the armrest is pivotally mounted to the outboard side of the seat back and is upwardly retractable along side of the seat back to allow easy entry for the vehicle occupant. The armrest is manually or automatically lowered into a operative position parallel to the seat bottom when in use. Preferably, a cover panel is hingedly attached to the outboard side of the armrest, and opens during a collision to expose an aperture in the arm rest through which the air bag deploys.

Advantages to an outwardly located armrest being attached to the seat, as opposed to being attached to the door, are disclosed in original application Ser. No. 07/912,790, now U.S. Pat. No. 5,378,036, issued Jan. 3, 1995, to John A. Townsend and entitled IMPROVEMENTS IN SLIDING AUTOMOBILE DOOR, incorporated herein by reference. These advantages include being able to automatically present a restraint belt to an occupant, having the armrest optimally positioned for use regardless of the adjustment of the seat position, providing optimally located passive protection from side impact such as a progressively deformable bolster, actuating the opening or closing of a vertically sliding door with the armrest, and allowing the entire seat and restraint system to be manufactured and installed in the vehicle as a single, integrated unit.

DETAILED DESCRIPTION OF THE PREFERRED EMBODIMENT

Figure 1:
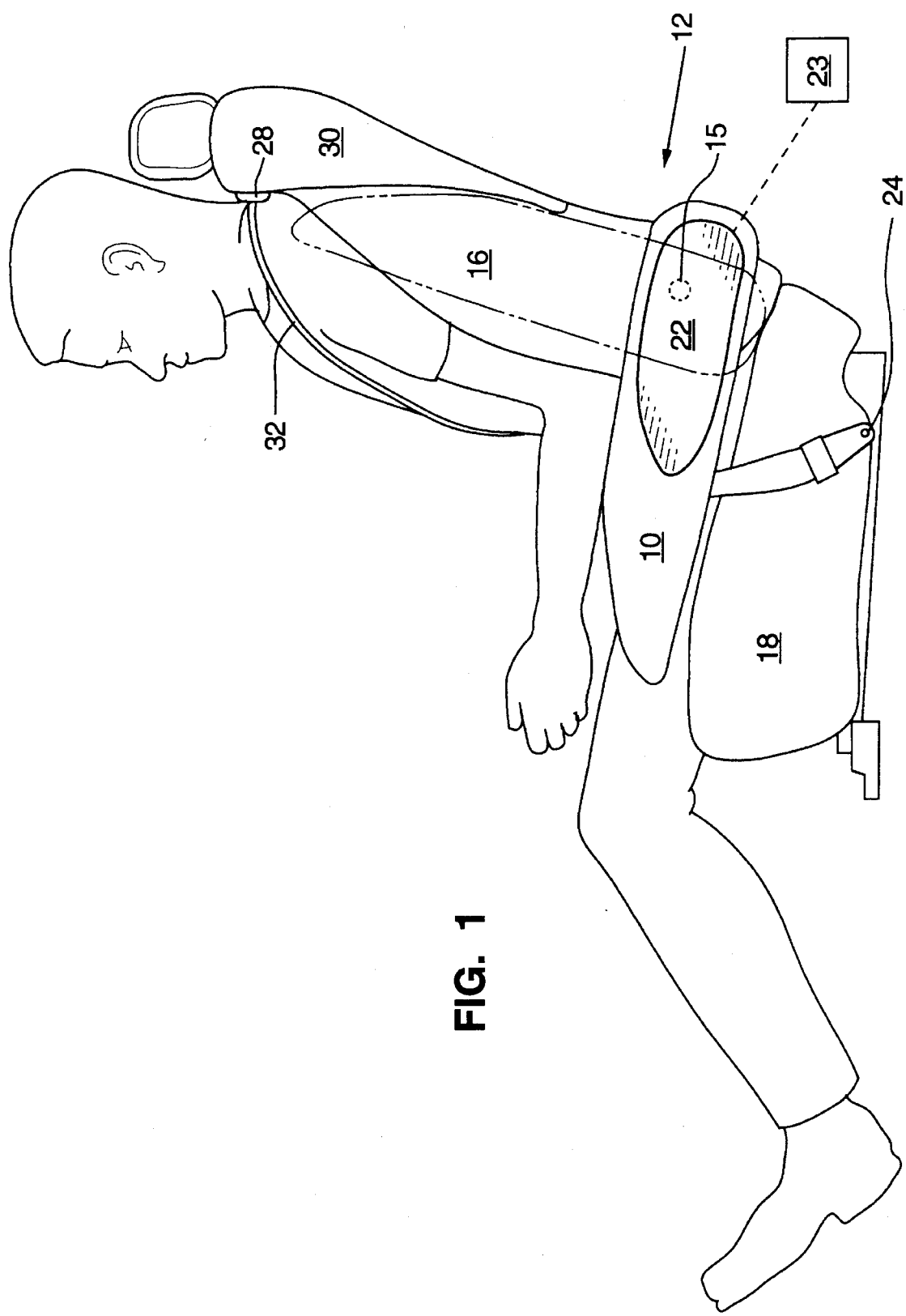
FIG. 1 is a side elevational view showing the inventive armrest in its operative position with the air bag stowed (and showing the armrest in a retracted position in phantom line.)
Figure 2:
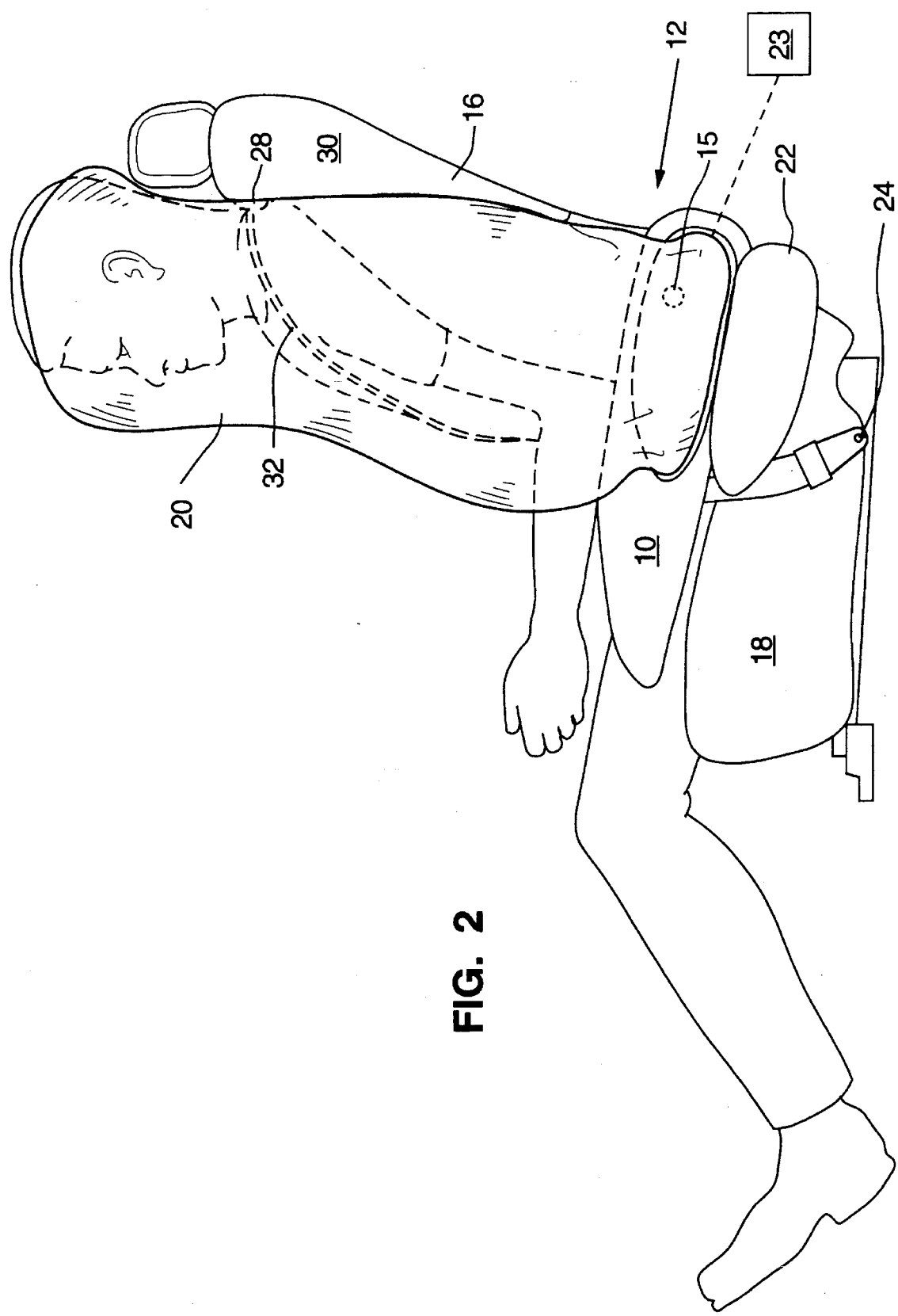
FIG. 2 is a side elevational view showing the inventive armrest with the air bag deployed.
Figure 3:
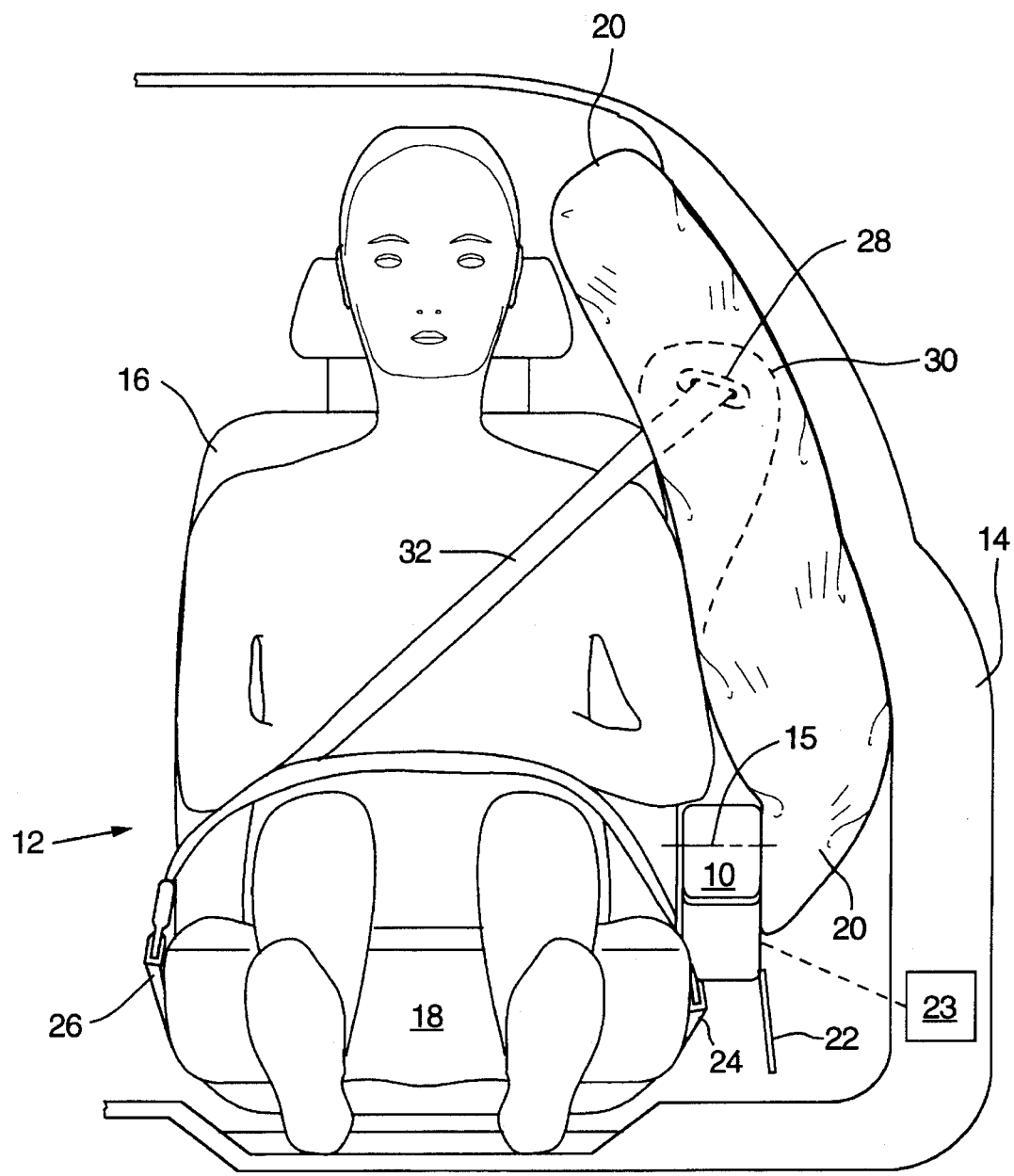
FIG. 3 is a front elevational view showing the inventive armrest with the air bag deployed.

Referring to FIGS. 1–3, the preferred embodiment of the inventive armrest 10 is shown in conjunction with a driver's seat 12. Installation of the armrest on a passenger seat would result in mirror-images of these figures. The armrest can also be used in a similar manner with the rear seats of a vehicle.

Referring to FIG. 3, armrest 10 is mounted to the outboard side of seat 12, between the vehicle occupant and vehicle door 14. The present invention can be used with a conventional vehicle door, but preferably it is used in conjunction with a vertically sliding door. The advantages and design of a vertically sliding door are fully described in original application Ser. No. 07/912,790, filed Jul. 13, 1992, issued as U.S. Pat. No. 5,378,036 on Jan. 3, 1995.

Referring to FIG. 1, armrest 10 is preferably pivotably mounted to the back rest 16 of seat 12. As shown, armrest 10 operates as a conventional armrest when the vehicle occupant is seated. To allow for easy ingress and egress, armrest 10 preferably pivots about pivot axis 15 into a retracted position up along side of back rest 16 (shown in phantom), or alternatively down adjacent to the seat bottom 18. Armrest movement between the retracted and operative positions can be driven manually or automatically. The advantages and design of a retracting outboard armrest, and how it can be used to present a restraint belt buckle to a vehicle occupant, are fully described in a related patent application, Ser. No. 08/477,200, filed Jun. 7, 1995, incorporated herein by reference.

Air bag 20 (not shown in its stowed position in FIG. 1, but shown deployed in FIGS. 2 and 3) is located within armrest 10, preferably towards the rear of armrest 10 adjacent to the occupant's hip. Cover panel 22 protects air bag 20 when not in use in its stowed position.

Referring to FIGS. 2 and 3, the deployment of air bag 20 will now be described. An impact sensor 23, well known in the art, is preferably located in the side of the vehicle or in door 14 and triggers the deployment of air bag 20 when a collision having a lateral component is sensed. A gas generator (not shown but well known in the art) is energized to inflate air bag 20. At the same time, cover panel 22 can be released by an electronic latch (not shown) which would inhibit tampering with air bag 20 when not in use. Alternatively, cover panel 22 can be pushed open by the thrust of the expanding air bag 20. Preferably, cover panel 22 is hingedly connected along its bottom edge to armrest 10 to allow cover panel 22 to pivot outward and downward, allowing air bag 20 to upwardly expand without restriction. Alternatively, cover panel 22 can be held in place entirely by detents (not shown) when air bag 20 is stowed, and pushed completely clear of the opening by the force of the deploying air bag 20.

Referring to FIG. 3, air bag 20 emerges from armrest 10 in an outwardly direction. Because the deploying air bag is not aimed at the occupant, the risk of deployment injury is minimized. Also, since air bag 20 is deployed against the smooth, predictable, interior surface of door 14, there is little chance of air bag 20 getting caught on anything as it extends up towards the occupant's head. Because armrest 10 is provided on seat 12 rather than on door 14, there is no need for protrusions or recessed areas in door 14. If a vertically sliding door is used, door levers are eliminated and door and window buttons can be located on a dashboard or console, leaving the interior surface of door 14 free of obstructions.

After air bag 20 is deployed against the interior of door 14, it extends quickly upward along the door to a fully deployed position where air bag 20 can protect the occupant's torso during a side impact, and preferably extends up to the occupant's head to protect it as well.

Because air bag 20 is deployed outwardly, armrest 10 is located between the occupant's hip and air bag 20 during a collision. Accordingly, armrest 10, including its internal structure and that of any air bag stowing canister (not shown), should be designed to be collapsible to absorb energy during a collision, or at least not contain parts that will cause injury if the occupant is thrown against it. Preferably, armrest 10 includes progressively deformable material where space allows to provide protection during any degree of collision.

For the present invention to work properly during a collision, armrest 10 obviously should be in the operative position shown in the figures and not in the retracted position (shown in phantom). A suitable interlock device or warning system should be used, especially if the armrest is configured to be moved manually, to prevent the vehicle from being driven with the armrest in the retracted position.

It is preferable if armrest 10 of the present invention is built into a seat having a fully integrated restraint system as shown. In such a seat the lower belt anchor point 24 and buckle latching mechanism 26 are securely attached to the lower structure of seat 12 rather than to the floor of the vehicle as are conventional restraint belt systems. Also, belt reel and tensioner unit 28 is integrated into seat appendage 30 rather than being mounted in the vehicle roof or B-pillar. Air bag 20 is much less likely to hang up on shoulder belt 32 when belt and reel tensioner 28 is located in seat 12 rather than directly on the vehicle. Further advantages to integrating a restraint belt system into the seat are fully described in related patent application Ser. No. 08/477,200, filed Jun. 7, 1995. The restraint belt system works in a conventional manner and should be used in conjunction with the air bag system.

The above descriptions and drawings are for illustrative purposes only, and are not exhaustive of possible alternate embodiments of the invention. It is to be understood that the present invention is not limited to the sole embodiments described above and illustrated herein, but encompasses any and all variations falling within the scope of the appended claims.

What is claimed as the invention is:

1. An air bag restraint apparatus for use in a vehicle having a body and a seat within the body, said apparatus arranged for protecting a vehicle occupant and comprising:

an armrest attached to and movable with the vehicle seat, the armrest located adjacent to an outboard side of the seat, said armrest having inboard and outboard sides, an air bag stowed within the armrest for deployment through the outboard side thereof into a space between the outboard side of the armrest and the vehicle body, whereby the air bag deploys outward against the vehicle body and expands upward along the body to protect the occupant's torso, neck and head from side impact, an impact sensor for triggering the deployment of the air bag during a collision, wherein the air bag is outwardly deployed away from the vehicle occupant.

2. An air bag restraint apparatus as claimed in claim 1 further comprising a cover panel releasably connected to the outboard side of the armrest for alternately covering and uncovering an aperture in the outboard side of the armrest, the cover panel serving to cover the air bag when stowed within the armrest and releasing outwardly during a collision to uncover the air bag and allow the air bag to deploy through the aperture.

3. An air bag restraint apparatus as claimed in claim 2 wherein the cover panel includes a lower edge that is hingedly connected to the armrest allowing the cover panel to pivot outward and downward when uncovering the aperture in the armrest.

4. An air bag restraint apparatus as claimed in claim 1 wherein the armrest is pivotably attached to a back rest portion of the seat.

5. In a motor vehicle having a lateral door movable between a closed position and an open position and a passenger seat located to the interior of and adjacent the door, said seat having an upwardly disposed backrest portion and a lower seat portion disposed at a level below the backrest portion, the improvement comprising:

a) an armrest carried by the seat in a disposition located between the seat and the door for movement between a withdrawn position permitting substantially unobstructed ingress and egress to the seat through the door when open and an operative position disposed above the level of the lower seat portion and between the seat and door when the door is in the closed position, said armrest having an outboard side facing the door when the armrest is in the operative position; and, b) an air bag located inside the armrest for deployment in the event of a collision through the outboard side thereof into a space between the armrest and the door and expansion into an area located between the door and a passenger supported by the seat wherein the air bag deploys outward against the door and expands upward along the door to protect the passenger's torso, neck and head from side impact.

6. An air bag restraint apparatus as claimed in claim 5 wherein the armrest is pivotably attached to the back rest portion of the seat.

* * * * *

UNITED STATES PATENT AND TRADEMARK OFFICE
CERTIFICATE OF CORRECTION

PATENT NO.   : 5,531,470
DATED        : July 2, 1996
INVENTOR(S)  : John A. Townsend It is certified that error appears in the above-indentified patent and that said Letters Patent is hereby corrected as shown below:

In Column 6 of the Claims, line 28, "scat" should be "seat"

Signed and Sealed this

Twenty-ninth Day of October 1996

Attest:

BRUCE LEHMAN

*Attesting Officer*  *Commissioner of Patents and Trademarks*